Sept. 23, 1952 E. W. SCHELLENTRAGER 2,611,605
HOUSING FOR SCALE MECHANISM
Filed Feb. 10, 1949 3 Sheets-Sheet 2

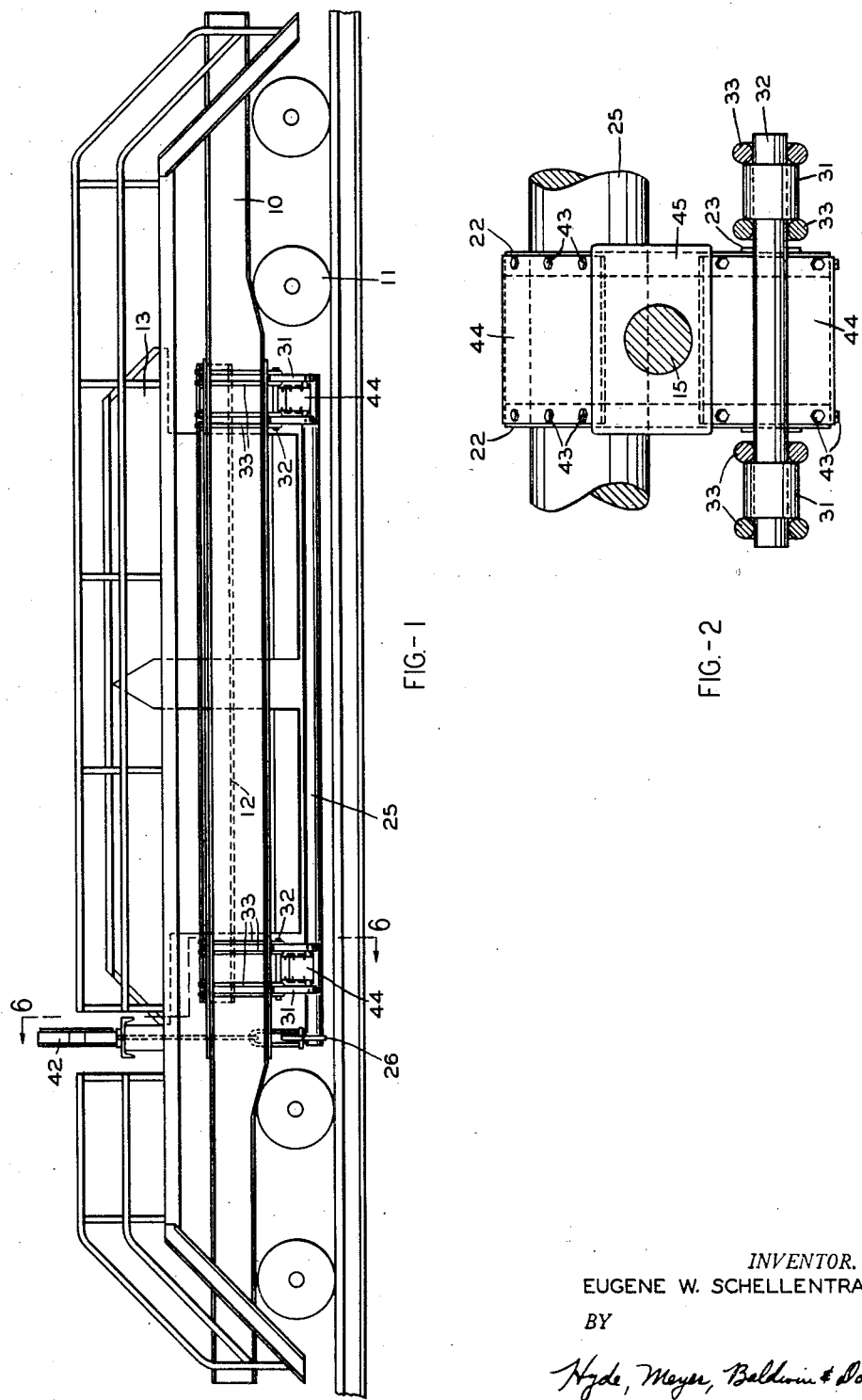

*INVENTOR.*
EUGENE W. SCHELLENTRAGER
BY
Hyde, Meyer, Baldwin & Doran
ATTORNEYS

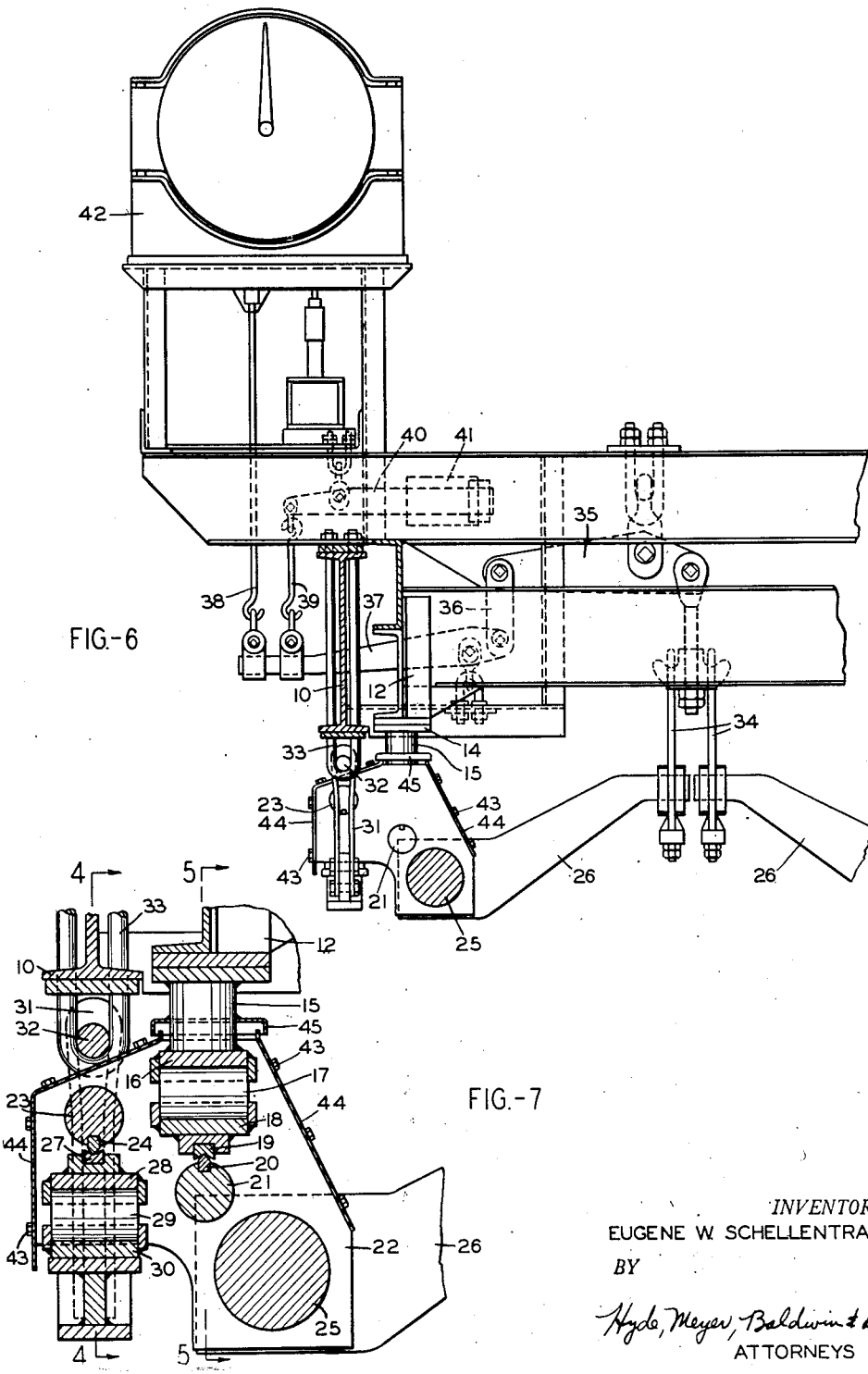

Patented Sept. 23, 1952

2,611,605

UNITED STATES PATENT OFFICE 2,611,605

HOUSING FOR SCALE MECHANISM

Eugene W. Schellentrager, Shaker Heights, Ohio, assignor to The Atlas Bolt & Screw Company, Cleveland, Ohio, a corporation of Ohio Application February 10, 1949, Serial No. 75,597

1 Claim. (Cl. 265—71)

This invention relates to indicating and recording heavy duty scale mechanism such as is used on railway scale cars employed at blast furnaces and/or other metallurgical plants, and more particularly has to do with a housing or guard for enclosing and protecting the scale bearings and pivots, as well as to certain features of the pivots themselves.

One object of the invention is to provide improved motion transmitting lever mechanism for heavy loads in which the pivotal joints include knife edge members so arranged as to permit the knife edges to be accurately located before or during attachment to the levers of which they form a part, insuring accuracy.

Another object is to simplify the formation and attachment of the knife edges to their supporting pins and of the pins to their respective levers, all for the purpose of securing accuracy in operation without increase in cost.

Another object is to provide improved motion transmitting lever mechanism for heavy duty scales in which the lever mechanism itself carries, or has formed as a part thereof, removable cover or guard members forming a protecting shield or housing for the more delicate pivot parts, thus preventing access of dirt and moisture to such parts and guarding them not only against wear, rust and corrosion, but also against shocks, jars and impacts of foreign bodies which might injure them or interfere with their normal or intended operation.

Another object is to provide a simple but sturdy assembly of lever and pivot parts, including an enclosing shield or cover therefor, which can be fabricated and assembled at low cost, but which is accurate and dependable in operation.

Further objects of the invention in part are obvious and in part will appear more in detail hereinafter.

In the drawings,

Fig. 1 is a side elevation, somewhat conventional, illustrating one form of scale car embodying the invention;

Fig. 2 is a detail sectional plan view on the line 2—2, Fig. 3;

Fig. 6 is a sectional elevation on the line 6—6, Fig. 1; and

Fig. 7 is a sectional elevation on the line 7—7, Fig. 3.

Figure 3:
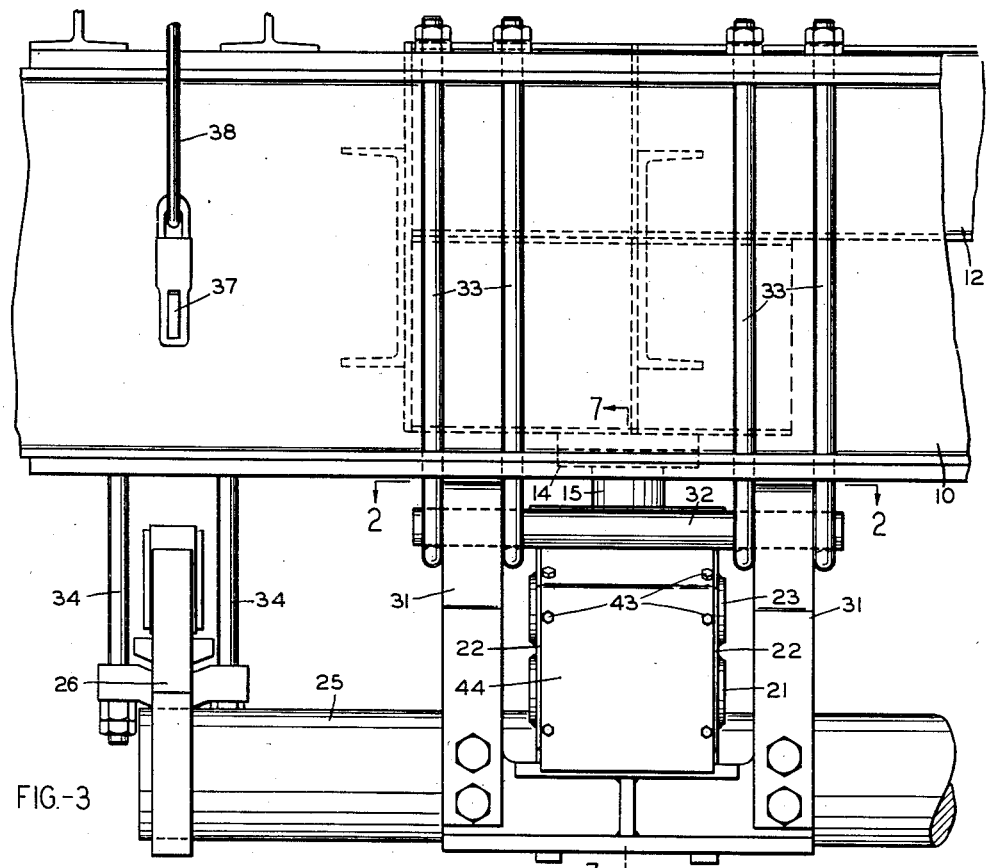
Fig. 3 is a detail side elevation, illustrating certain parts of the car body and the scale parts mounted thereon.
Figure 4:
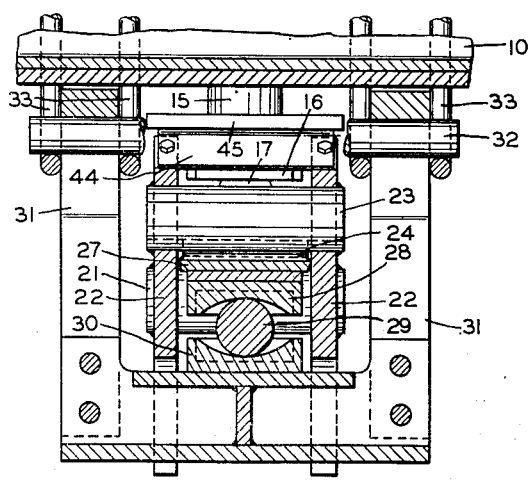
Fig. 4 is a detail sectional elevation on the line 4—4, Fig. 7, looking in the direction of the arrows.

In a general way the car as a whole may be any suitable form and proportions. It includes a strong stationary main frame, marked generally 10, made of structural steel shapes welded or riveted together and mounted upon wheels 11. In the stationary main frame is mounted or supported a movable frame 12 carrying a hopper or load receptacle 13. Adjacent members of the two frames 10, 12 are shown in Fig. 6. They are connected by suspension and spring mechanism later described and which permits member 12 to move downwardly relative to member 10, as the load increases. The relative motion between the two is taken advantage of to actuate the scale indicating mechanism in the usual manner.

In the particular railway car shown in the drawings, the hopper frame is suspended from the main frame at each of the four corners of the car, so that the suspension mechanism includes four similar sets of parts, but one of which will be described. The two sets on each side of the car are coupled to work as a unit, and the two units are coupled in parallel to both work upon and operate a single system of motion transmitting lever mechanism extending up to the spring and indicating dial mechanism, all as will now appear.

Figure 5:
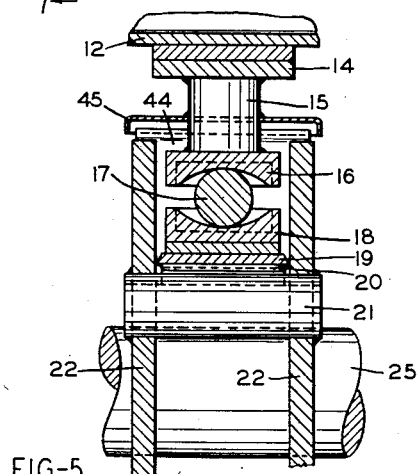
Fig. 5 is a similar section on the line 5—5, Fig. 7.

Referring to Figs. 5, 6 and 7, at each of its corners, the hopper frame 12 rests upon and is secured to the cap 14 of a heavy pillar 15, the foot or base 16 of which has a shallow inverted bottom recess to receive a roller 17 resting in a support 18 similarly recessed, the two recesses permitting some horizontal go and come or accommodation to car travel, sway and the like. Support 18 is provided with a bottom seat member 19 to receive the elongated knife edge of generally rectangular member 20 welded in a key slot in solid cylindrical pin 21. This extends through and is welded to each of two end members 22 of suitable form, which may either be castings or be cut from thick heavy steel plates, and are shown of the latter form. The same two plates are similarly connected by a second pin 23 having a corresponding knife edge member 24, but here turned down instead of up, and also by a plain cylindrical side bar or shaft 25 of considerably larger diameter, say as much as 8 inches in diameter. This bar 25 not only cross-connects the two plates of a pair at one corner of the hopper frame, but it also connects in unit form the plates of the two suspension sets on the same side of the car and also serves to support the motion transmitting arm 26 which actuates the indicating mechanism and of course the scale spring. This arm is welded to one end portion of bar 25, the other end thereof being plain.

The knife edge member 24 of the second pin 23 rests upon a seat member 27 carried by a recessed cap 28 resting upon roller 29 supported by recessed base 30 (similar to members 16, 17, 18) said base being suspended by straps 31, pin 32 and U rods 33 from the main or stationary frame 10, as shown in Fig. 6.

Thus the main or primary lever of the scale mechanism (one such lever on each side of the car) includes the four plate members 22, the bar 25 to which they are welded and the motion transmitting arm 26. The lever is of the second order, with its fulcrum at the knife edges 24, the load applied at the knife edges 20, and the sustaining force at the end of arm 26.

The two arms 26 are connected by links 34 to one arm of lever 35, the other arm of which is connected by links 36 to an arm of lever 37, the other arm of which has connected thereto two sets of links 38, 39. Links 39 are connected to one arm of a lever 40 carrying a counterweight 41 which absorbs part of the load, and to that extent relieves the scale spring. Links 38 extend up into the housing 42 of the scale where they are suitably connected to the scale spring and indicating pointer (not shown).

One important aim or object of the present invention has been to so form the parts of the scale lever mechanism and more particularly of the main or primary lever, as to enable the knife edges and their seats, and also the roller bearings to be encased or enclosed to protect them from water, corrosion, or mechanical injury. The encasing or enclosing parts here are removably attached to the lever mechanism itself, forming a part thereof, but at any time may be taken off to provide access to the knife edges and rollers, and then restored to place, or may be discarded if the user prefers. This is accomplished, in the present construction by utilizing the end lever members 22 as walls of the enclosing housing and also as supports for the cover members.

As shown, the peripherally extending edge portions of members 22, extending vertically and diagonally, are tapped at intervals to receive screws 43 to secure thereto several sheet metal plates 44. At the top, a shallow inverted sheet metal cover 45 is placed around the pillar 15, between its cap and base, before they are welded to the pillar. After assembly of the parts cover 45 is welded to the pillar at a level high enough so that it does not engage the plates 44 when the hopper body moves down under load. The edges of cover 45 extend beyond the edges of plates 44.

Thus the entire knife edge and roller assembly is fully enclosed in a box, open at the bottom, but completely shielding the inner parts against access of moisture, water, dirt or any foreign substances or masses. At the same time access to parts may be had at any time. The enclosing casing parts are attached to and form a part of the main lever and float or move with it and the construction is materially simpler than a guard attached to or carried by the main or stationary car frame.

The knife edge pivots also are of special construction, easy to install in positions determined with accuracy, and of a form capable of full protection in the manner before described.

Each knife edge member is in the form of a short length of cylindrical steel bar milled with a longitudinal key way to receive a knife edge shaped to fit the key way. In these scale mechanisms, exact lengths and proportions of the arms of the multiplying levers are essential to accurate and dependable weight determination. Yet, since these scales are for heavy duty, weighing tons instead of pounds, the pins and knife edges are relatively large and heavy and difficult to locate exactly in the heavy end plates of members 22 to which they are attached by welding.

By utilizing pins of cylindrical cross-section, the openings for them in plates 22 may be bored with reasonably accurate spacing. Then the pins are inserted in their respective holes and with the parts so set up, one or both pins may be rotated a small amount one way or the other to secure the desired lever arm spacing between the two knife edges, whereupon the two pins are welded in situ.

Such a system and arrangement insures unusual accuracy by simple means for this purpose.

What I claim is:

In heavy duty weighing mechanism for movable scale cars of the type having a sub-frame movable responsive to variations of load thereon, a motion transmitting lever comprising an elongated heavy bar adapted for mounting beneath, and operatively engaged by, said sub-frame, two lever arms rigidly fixed to said bar, a first such lever arm adapted to be responsive to load applications to said sub-frame, and a second such lever arm being adapted to transmit such responses to scale means, the first said lever arm comprising two metal plates spaced in parallel relationship on said bar, each said plate having a first circular aperture equidistant from said bar, and each said plate having a second circular aperture, said second apertures also being equidistant from said bar, said first apertures being axially aligned and said second apertures being likewise axially aligned, two parallel pivot pins extending transversely between said plates, one such pin having opposed cylindrical end portions fittedly supported in said first apertures, and the other such pin having opposed cylindrical end portions fittedly supported in said second apertures, each pin being provided with a longitudinally extending keyway, a knife edged member fixedly seated in each keyway, each such pin being initially rotatable with respect to said plates whereby to permit accurate positioning of said knife edges relative to said plates, and whereby, when thus accurately positioned, each pin may be permanently secured in the desired position, a supporting column extending downwardly from said sub frame and resting on one said knife edge, said parallel plates being provided with guard means removably attached to the edges of said plates and extending across the space therebetween, said supporting column extending downwardly through said guard means with clearance spacing therefrom, said guard means having an upturned flange surrounding and defining said clearance spacing, said column having an imperforate cap member fixed thereto, said cap member having a peripheral downturned flange telescopingly surrounding said upturned flange but with clearance therefrom whereby to permit relative movement between said guard means and said cap while avoiding mutual contact between said guard means and said cap.

EUGENE W. SCHELLENTRAGER.

REFERENCES CITED

The following references are of record in the file of this patent:

UNITED STATES PATENTS

| Number | Name | Date |
|---|---|---|
| 1,268,197 | Winslow | June 4, 1918 |
| 1,337,635 | Bird | Apr. 20, 1920 |
| 1,650,204 | Gilbert | Nov. 22, 1927 |
| 1,759,902 | Howard | May 27, 1930 |
| 1,800,789 | Gervais | Apr. 14, 1931 |
| 2,036,042 | Gumprich | Mar. 31, 1936 |
| 2,162,622 | Lindsay | June 31, 1939 |
| 2,279,678 | Hem | Apr. 14, 1942 |
| 2,329,969 | Winter | Sept. 21, 1943 |